(12) United States Patent
Fritz et al.

(10) Patent No.: US 7,845,075 B2
(45) Date of Patent: Dec. 7, 2010

(54) METHOD FOR MANUFACTURING A CAMSHAFT

(75) Inventors: Oliver Fritz, Aichtal (DE); Tilo Hentschel, Albershausen (DE); Hermann Hoffmann, Stuttgart (DE); Martin Lechner, Lindlar (DE)

(73) Assignee: Mahle Ventiltrieb GmbH, Stuttgart (DE)

( * ) Notice: Subject to any disclaimer, the term of this patent is extended or adjusted under 35 U.S.C. 154(b) by 1249 days.

(21) Appl. No.: 10/574,629

(22) PCT Filed: Jul. 15, 2005

(86) PCT No.: PCT/DE2005/001250

§ 371 (c)(1),
(2), (4) Date: Apr. 5, 2006

(87) PCT Pub. No.: WO2006/015570

PCT Pub. Date: Feb. 16, 2006

(65) Prior Publication Data
US 2007/0039172 A1 Feb. 22, 2007

(30) Foreign Application Priority Data
Aug. 13, 2004 (DE) .................. 10 2004 039 302

(51) Int. Cl.
*B21K 1/12* (2006.01)
*B23P 21/00* (2006.01)
*F01L 1/04* (2006.01)

(52) U.S. Cl. .................. 29/888.1; 29/434; 29/447; 29/464; 29/466; 29/469; 74/567; 123/90.6

(58) Field of Classification Search ............... 29/888.1, 29/888.08, 434, 447, 464, 466, 469; 123/90.6; 74/567–569
See application file for complete search history.

(56) References Cited

U.S. PATENT DOCUMENTS 4,616,389 A 10/1986 Slee
(Continued)

FOREIGN PATENT DOCUMENTS

DE 3301749 4/1984
(Continued)

OTHER PUBLICATIONS

International Search Report.

*Primary Examiner*—David P Bryant
*Assistant Examiner*—Sarang Afzali
(74) *Attorney, Agent, or Firm*—Collard & Roe, P.C.

(57) ABSTRACT

A camshaft has at least two completely machined individual cams fixedly mounted on a shaft in predetermined angular positions. The shaft includes an outside shaft and an inside shaft arranged concentrically in the former, and is to be manufactured in such a way that remachining of the joined camshaft is not necessary. This is by combining the individual cams even before they are mounted on a shaft and joining them to this shaft to form a machining module, such that the individual cams are combined in their mutual arrangement in relation to one another in which the cams are to be mounted on the finished camshaft. The final machining of the cams is performed within this machining nodule. When the cams are completely machined in this way, the cams are joined to the shaft of the camshaft within the machining module. This ensures that the desired mutual arrangement is maintained, i.e., that remachining is not necessary.

20 Claims, 3 Drawing Sheets

U.S. PATENT DOCUMENTS

| | | | |
|---|---|---|---|
| 5,201,246 A * | 4/1993 | Arnold et al. | 74/567 |
| 5,299,881 A | 4/1994 | Mettler-Friedli | |
| 5,664,463 A | 9/1997 | Amborn et al. | |
| 6,725,818 B2 * | 4/2004 | Methley | 123/90.27 |
| 2002/0170514 A1 * | 11/2002 | Methley | 123/90.16 |

FOREIGN PATENT DOCUMENTS

| | | |
|---|---|---|
| DE | 39434271 | 12/1989 |
| DE | 3943426 | 4/1991 |
| DE | 4306621 | 4/1994 |
| DE | 19757504 | 7/1997 |
| EP | 0331938 | 9/1989 |
| EP | 1362986 | 11/2003 |

* cited by examiner

METHOD FOR MANUFACTURING A CAMSHAFT

CROSS REFERENCE TO RELATED APPLICATIONS

Applicants claim priority under 35 U.S.C. §119 of German Application No. 10 2004 039 302.8 filed Aug. 13, 2004. Applicants also claim priority under 35 U.S.C. §365 of PCT/DE2005/001250 filed Jul. 15, 2005. The international application under PCT article 21(2) was not published in English.

BACKGROUND OF THE INVENTION

1. Field of the Invention

The present invention relates to a method for manufacturing a camshaft according to the preamble of patent Claim 1.

2. The Prior Art

In the manufacture of camshafts in which the individual cams are not to be remachined after attaching and/or joining, one problem is how to join the individual cams accurately in the predetermined angular positions. Because of this difficulty, remachining is always necessary by grinding the cam contours after joining the individual cams or the tolerance limits of the cam positions must be determined by the joining process.

U.S. Pat. No. 5,664,463 A describes a method for manufacturing a camshaft, in which at least two individual completely machined cams are fixedly mounted on a shaft in predetermined angular positions, whereby the shaft may consist in particular of an outer shaft and an inner shaft arranged coaxially in the former.

European Patent 0 331 938 A describes how a subsequent machining of the contours of individual cams on a completely joined camshaft can be prevented if the cams are positioned accurately in assembly. The respective cams are each individual cams which are to be machined separately as individual cams.

U.S. Pat. No. 4,616,389 A describes a method for manufacturing a camshaft in which the cams are aligned on a mounting shaft in an arrangement corresponding to the final arrangement on the camshaft. After removing the mounting shaft, the aligned cams are chucked by another device for machining their boreholes. The completely machined cams are mounted on a respective shaft to form the camshaft being manufactured, namely by shrinking the cams onto the shaft.

According to U.S. Pat. No. 5,299,881A, the cams can be ground as a module. The ground cams are mounted individually on a shaft to produce a camshaft.

In a generic process for manufacturing camshafts, the present invention relates to the problem of eliminating remachining of the contours of the individual cams on the completely assembled camshaft.

In a generic manufacturing process, this problem is solved primarily through the process steps according to the characterizing features of patent Claim 1.

Advantageous and expedient embodiments are the object of the subclaims.

The present invention is based on the general idea of combining the individual cams even before they are mounted on a shaft and joining them to this shaft to form a machining module, such that the individual cams are combined in their mutual arrangement in relation one another in which the cams are to be mounted on the finished camshaft. The final machining of the cams is performed within this machining module. When the cams are completely machined in this way, the cams are joined to the shaft of the camshaft within the machining module. This ensures that the desired mutual arrangement is maintained, i.e., that remachining is not necessary.

If only two cams are to be joined in a mutual fixedly predetermined arrangement on a shaft, then a corresponding machining module would consist only of these two cams and optionally axial spacers arranged between these cams.

SUMMARY OF THE INVENTION

Screws may be used as the means for joining the individual elements in a machining module for an axial bracing of the individual elements to one another, or after inserting dowel pins, screws may be used as tension means in machining and in joining. The screws may be in the form of countersunk screws. Instead of screws as tension means, any other tension means may be used when using dowel pins, such as the generally known tension means used in grinding and polishing.

With the inventive method, it is very advantageously possible to manufacture a camshaft having cams that are variably rotatable with respect to one another. In the case of one such camshaft known from European Patent 1 362 986 A1, for example, an inside shaft is mounted concentrically in an outside shaft, the two shafts being rotatable in relation to one another. First cams are fixedly connected to the outside shaft and second cams are fixedly connected to the inside shaft. These second cams are fixedly connected to the inside shaft, e.g., by connecting elements such as dowel pins that are secured in the inside shaft, penetrate through these cams radially and pass through the outside shaft through a recess provided there. Such second cams are rotatably mounted on the outside shaft. Subsequent machining of cams that have already been completely joined together—and are mutually adjustable to some extent—is difficult, so the inventive method has proven especially advantageous for this.

If a second cam, which must be provided with a radial borehole to receive a fastening element, e.g., a dowel pin, for an adjustable camshaft, is in a machining module to be thereby positioned within the finished camshaft and to be rotatable, then this borehole can be produced while the respective second cam is in the machining module. This ensures an accurate angular position of the respective second cam within the finished camshaft.

BRIEF DESCRIPTION OF THE DRAWINGS

Advantageous exemplary embodiments are illustrated in the drawing and described in greater detail below.

These drawings show.

DETAILED DESCRIPTION OF THE PREFERRED EMBODIMENTS

Two first cams 1, 2 are joined together in one machining module, each first cam being situated on an outer end axially. Between these two first cams 1, 2 there is a second cam 4 which is located at the center of the machining module and is spaced a distance axially away from the former via spacers 3 that are open at the circumference.

The total of three first and second cams 1, 2, 4 are linked together by two screws 5 that are approximately in opposition on the circumference. The two screws 5 are preferably designed as countersunk screws.

The cams 1, 2, 4 which are thus fixedly joined together in the machining module can be completely machined in this state, namely in particular with regard to their outside cam contours and their inside diameters.

The inside diameters of all the cams 1, 2, 4 are preferably selected to be the same in order to simplify machining.

Figure 6:
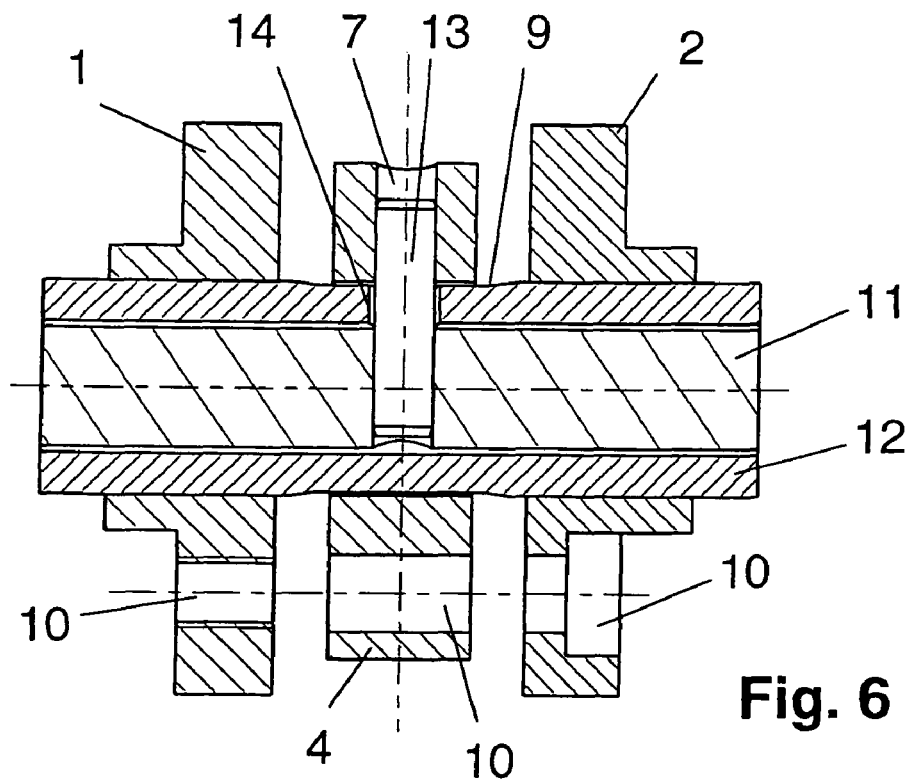

The exemplary embodiment shown here concerns cams 1, 2, 4 for a camshaft having cams that are mutually variably adjustable with regard to their angular positions. The shaft belonging to cams 1, 2, 4 is made up of an inside shaft 11 and an outside shaft 12, which surrounds the former concentrically (6). The two shafts 11, 12 are rotatable in relation to one another. The relative rotation is usually accomplished by the fact that the inside shaft 11 is rotated inside the outside shaft 12. The two first cams 1, 2 which are situated on the outside axially in the machining module are intended for a tight seating on the outside shaft 12. The second cam 4, situated between these two cams 1, 2, is designed for a tight connection on the inside shaft 11. In the case of the tight connection with the inside shaft, the second cam 4 is provided with an inside diameter which allows a rotatable play-free bearing of the second cam 4 on the outside shaft 12 (FIG. 6). The connection of the second cam 4 with the inside shaft 11 is accomplished by a fastening element which may be a dowel pin 13. This dowel pin 13 is secured on one end in the fitting borehole 7 in the second cam 4 and on the other end in a borehole in the inside shaft 11, also passing through a recess 14 in the form of an elongated hole in the outside shaft 12. The fitting bore 7 of the second cam 4 is created while this second cam 4 is in the closed machining module.

The cams 1, 2, 4 have already been completely machined except for the machining operations performed while in the machining module.

After mounting the machining module on the outside shaft 12 of the camshaft, which is shown as an adjustable camshaft in the exemplary embodiment (FIG. 6), i.e., after the end of machining and when there is a connection, e.g., a shrink connection, between the first cams 1, 2 and the outside shaft 12, the machining module is opened and the screws 5 and the spacers 3 that are open on the circumference are removed. The boreholes 10 remaining in the cams 1, 2, 4 necessarily lead to the advantage of a weight reduction in cams having these boreholes 10.

Figure 1:
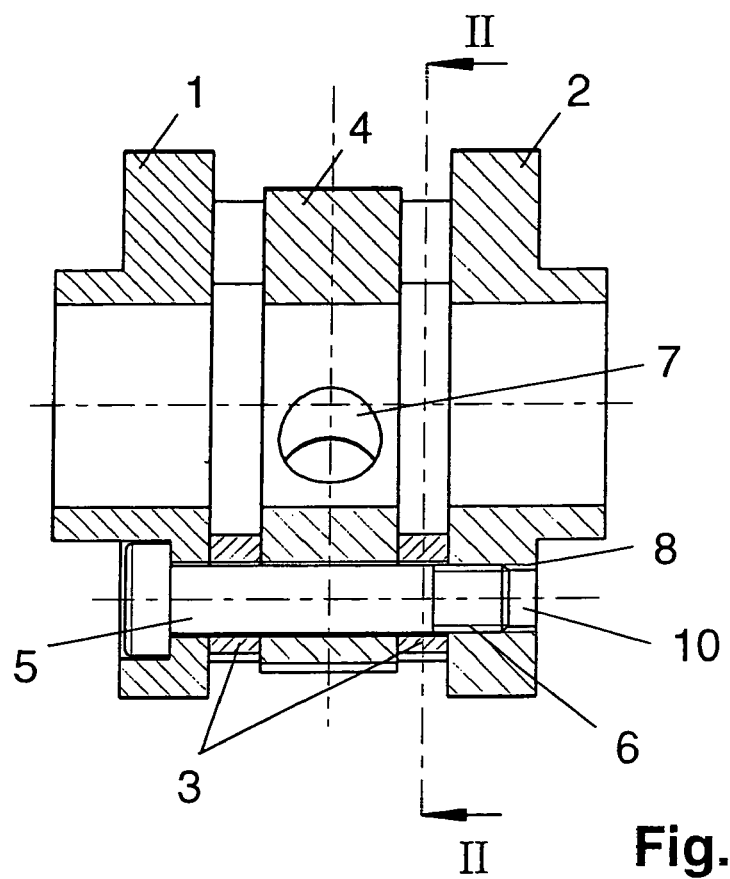
FIG. 1 a longitudinal section according to line I-I in FIG. 2 through a machining module having a total of three cams, FIG. 2 a radial section through the machining module according to line II-II in FIG. 1, FIG. 3 a longitudinal section through a machining module according to line III-III in FIG. 4 with an alternative type of screw connection in comparison with the embodiment according to FIGS. 1 and 2, FIG. 4 a radial section according to line IV-IV of the machining module in FIG. 3, FIG. 5 a longitudinal section through the machining module according to line V-V in FIG. 4, FIG. 6 a longitudinal section through a completely joined adjustable camshaft having an inside shaft and an outside shaft.
Figure 2:
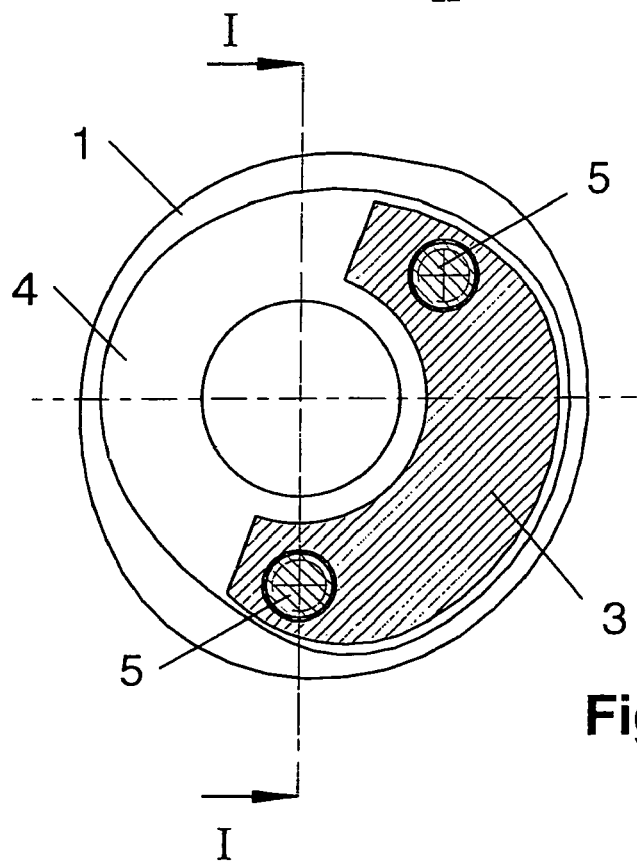
Figure 3:
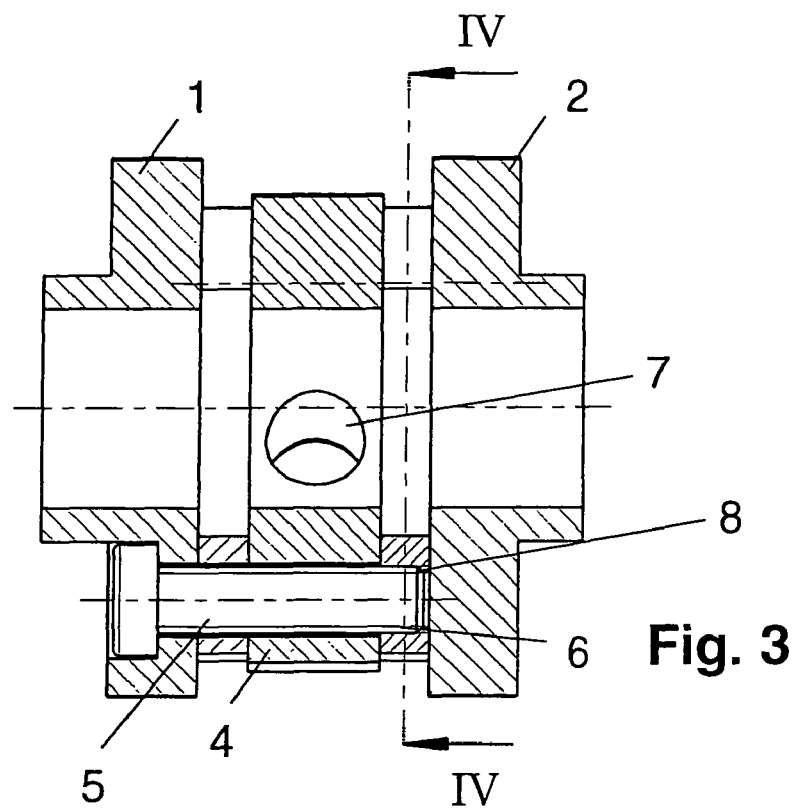
Figure 4:
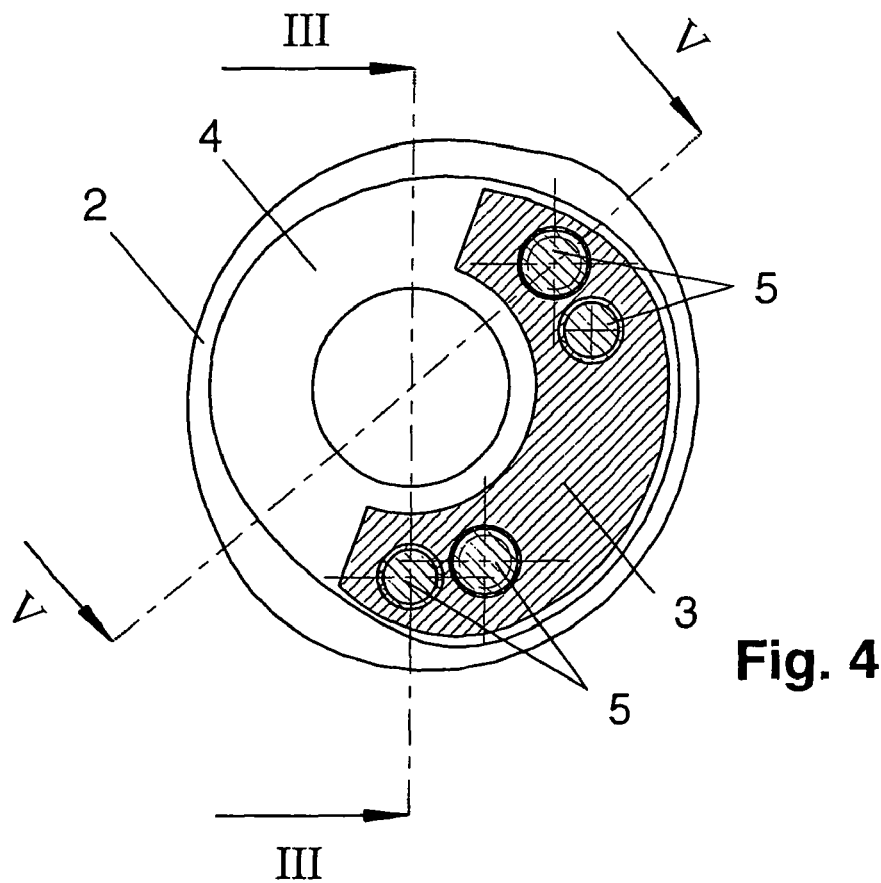
Figure 5:
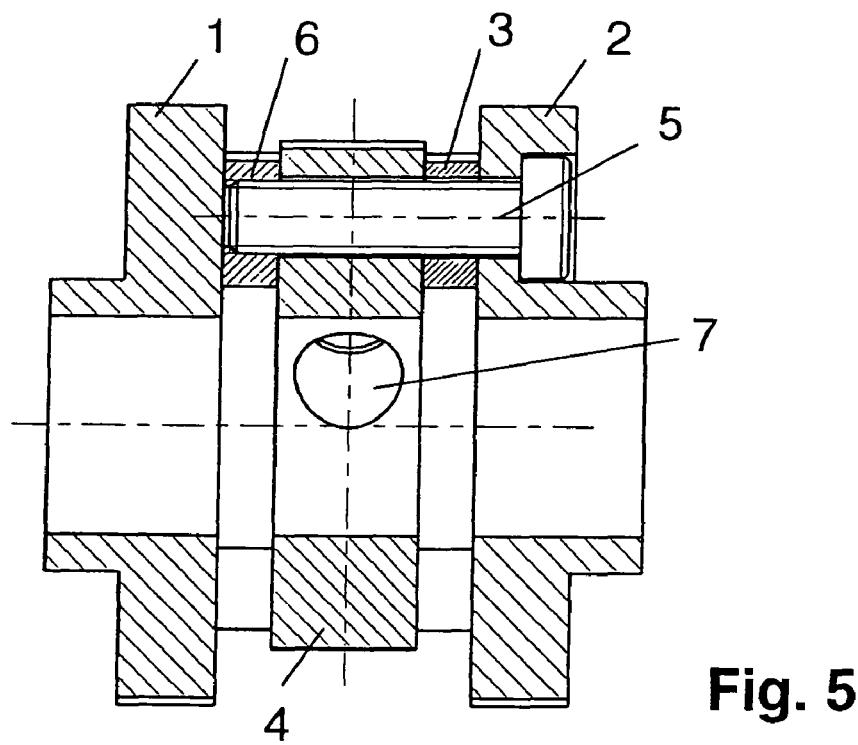

To accommodate the screws 5, which are inserted as connecting means in a machining module, a thread 8 may advantageously be provided on the optional spacers 3 (FIGS. 3 through 5). In the case of such an embodiment, at least two screws 5 may be used in opposite directions axially with regard to their head position and thread position to ensure a play-free and detachable arrangement in relation to the cams 1, 2, 4 (FIGS. 3 through 5). Accordingly, the spacers 3 must have at least four boreholes, at least two of which are designed as through-bores and two of which are designed as a thread 8. The advantage of this type of connection inside the machining module is first the possibility of reusing the spacers which are acted upon by the thread and are thus expensive and secondly the simpler machine-ability of all the cams 1, 2, 4.

In order to be able to machine an adjustable second cam 4 in the machining module to an inside diameter that is the same as that of the other first cams 1, 2, the outside shaft 12 must have a recess 9 having a reduced diameter in the area in which the second cam 4 comes to lie (FIG. 6). The outside diameter of the outside shaft 12 is reduced to such an extent that the second cam 4 can be mounted on the outside shaft 12 rotatably and without any play in this area.

The radial circumferential surface of the cams 1, 2, 4 is understood to refer to their inside surfaces and the concentric outside surfaces and/or cam surfaces. The cam contours are especially important with respect to machining within the machining module.

With the finished adjustable camshaft illustrated in FIG. 6 having an inside shaft 11 and an outside shaft 12, the first cams 1, 2 are tightly shrunk onto the outside shaft 12. The rotatable second cam 4, which is situated between these two first cams 1, 2 and is rotatable with respect to them, is fixedly connected to the inside shaft 11 by a dowel pin 13. To permit a relative rotation between the inside shaft 11 and the outside shaft 12, the dowel pin 13 in the outside shaft fits through a recess 14 in the form of an elongated hole in the circumferential direction.

All the features described in the description and characterized in the following claims may be essential to the invention either individually or combined in any desired manner.

The invention claimed is:

1. A method for manufacturing a camshaft having individual cams in predetermined angular positions in relation to one another on a shaft
   wherein the following manufacturing steps are performed in chronological order:
   (1) connecting the cams by detachable connecting means to form a detachably assembled machining module wherein the cams are aligned in relation to one another in predetermined fixed angular positions,
   (2) completely machining all cam contours of the module,
   (3) mounting the machined module on the shaft,
   (4) individually connecting each of the cams of the module to the shaft,
   (5) detaching and removing the connecting means.

2. The method for manufacturing a camshaft on which the cams (1, 2, 4) are equal distance apart in an axial direction, according to claim 1,
   wherein
   axial spacings in the machining module are set by spacers (3) used there.

3. The method according to claim 1,
   wherein, spacers (3) as components that are open at the circumference are provided with an opening with a diameter larger than the respective outside diameter of the shaft occupied by the cams, whereby this is true with regard to the outside diameter of the outside shaft (12) in the case of a shaft composed of an inside shaft (11) and an outside shaft (12).

4. The method according to claim 1, in which one of the cams (1, 2, 4), namely a second cam (4) has a radial fitting borehole (7) to receive a fastening element (13) which secures this second cam (4) on the inside shaft (11),
   wherein the fitting borehole (7) is created while the respective second cam (4) is within the machining module.

5. The method according claim 1, wherein screws (5) which pass axially through the cams (1, 2, 4) serve as the means for producing a detachable joining.

6. The method according claim 1,
wherein at least two screws (5) are distributed over the circumference of the cams (1, 2, 4).

7. The method according to claim 1, comprising the features
a thread (6) of a screw (5) engages in a mating thread which is provided in a spacer (3) situated at a distance from the screw head,
at least two screws (5) are inserted in opposite directions axially with regard to the position of their heads and threads.

8. The method according claim 1,
wherein axial dowel pins are used as positioning means inside the machining module.

9. The method according to claim 1,
wherein screws (5) are designed as fitting screws.

10. The method according to claim 1, for manufacturing a camshaft in which the shaft on which the cams (1, 2, 4) are mounted is made of two shafts that are adjustable in relation to one another and are situated concentrically one inside the other, namely an inside shaft (11) and an outside shaft (12) and first cams (1, 2) are fixedly connected to the outside shaft (12) and second cam (4) are fixedly connected to the inside shaft (11) via radial connecting elements (13) which pass through the outside shaft (12),
wherein
the machining of the radial inside surfaces for all cams (1, 2, 4) is performed for all cams to the same diameter and
a recess (9) having a reduced diameter is provided on the outside shaft (12) for receiving the second cam (4), whereby the reduction is of such an extent that play-free rotation of the second cam (4) on the outside shaft (12) is ensured.

11. A method for manufacturing a variable camshaft having an outside shaft and an inside shaft with first cams connected to the outside shaft and second cams connected to the inside shaft,
wherein the following manufacturing steps are performed in chronological order:
(1) connecting the cams by detachable connecting means to form a detachably assembled machining module wherein the cams are aligned in relation to one another in predetermined fixed angular positions,
(2) completely machining all cam contours of the module,
(3) mounting the machined module on the outside shaft,
(4) individually connecting each of the cams of the module to its respective shaft,
(5) detaching and removing the connecting means.

12. The method for manufacturing a camshaft on which the cams (1, 2, 4) are equal distance apart in an axial direction, according to claim 11,
wherein axial spacings in the machining module are set by spacers (3) used there.

13. The method according to claim 11,
wherein spacers (3) as components that are open at the circumference are provided with an opening with a diameter larger than the respective outside diameter of the shaft occupied by the cams, whereby this is true with regard to the outside diameter of the outside shaft (12) in the case of a shaft composed of an inside shaft (11) and an outside shaft (12).

14. The method according to claim 11, in which one of the cams (1, 2, 4), namely a second cam (4) has a radial fitting borehole (7) to receive a fastening element (13) which secures this second cam (4) on the inside shaft (11),
wherein the fitting borehole (7) is created while the respective second cam (4) is within the machining module.

15. The method according to claim 11,
wherein screws (5) which pass axially through the cams (1, 2, 4) serve as the means for producing a detachable joining.

16. The method according to claim 11,
wherein at least two screws (5) are distributed over the circumference of the cams (1, 2, 4).

17. The method according to claim 11, comprising the features
a thread (6) of a screw (5) engages in a mating thread which is provided in a spacer (3) situated at a distance from the screw head,
at least two screws (5) are inserted in opposite directions axially with regard to the position of their heads and threads.

18. The method according to claim 11,
wherein axial dowel pins are used as positioning means inside the machining module.

19. The method according to claim 11,
wherein screws (5) are designed as fitting screws.

20. The method according to claim 11, for manufacturing a camshaft in which the shaft on which the cams (1, 2, 4) are mounted is made of two shafts that are adjustable in relation to one another and are situated concentrically one inside the other, namely an inside shaft (11) and an outside shaft (12) and first cams (1, 2) are fixedly connected to the outside shaft (12) and second cam (4) are fixedly connected to the inside shaft (11) via radial connecting elements (13) which pass through the outside shaft (12),
wherein
the machining of the radial inside surfaces for all cams (1, 2, 4) is performed for all cams to the same diameter and
a recess (9) having a reduced diameter is provided on the outside shaft (12) for receiving the second cam (4), whereby the reduction is of such an extent that play-free rotation of the second cam (4) on the outside shaft (12) is ensured.

* * * * *